United States Patent
Yang et al.

(10) Patent No.: US 9,986,267 B2
(45) Date of Patent: May 29, 2018

(54) METHODS AND SYSTEMS FOR DYNAMICALLY EDITING, ENCODING, POSTING AND UPDATING LIVE VIDEO CONTENT

(71) Applicant: Disney Enterprises, Inc., Burbank, CA (US)

(72) Inventors: Edward Yang, Hicksville, NY (US); Josef Bell, Saint Albans, NY (US)

(73) Assignee: Disney Enterprises, Inc., Burbank, CA (US)

(*) Notice: Subject to any disclaimer, the term of this patent is extended or adjusted under 35 U.S.C. 154(b) by 0 days. days.

(21) Appl. No.: 14/921,807

(22) Filed: Oct. 23, 2015

(65) Prior Publication Data

US 2017/0118495 A1 Apr. 27, 2017

(51) Int. Cl.
*H04N 21/234* (2011.01)
*H04N 21/2747* (2011.01)
*H04N 21/2383* (2011.01)
*H04N 21/81* (2011.01)

(52) U.S. Cl.
CPC ... *H04N 21/23424* (2013.01); *H04N 21/2383* (2013.01); *H04N 21/2747* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 8,756,641 B2* | 6/2014 | Ivanov | H04N 21/4524 725/110 |
| 2007/0162487 A1* | 7/2007 | Frailey | H04N 7/165 |
| 2013/0302005 A1* | 11/2013 | Harwell | H04N 21/2408 386/200 |
| 2014/0157336 A1* | 6/2014 | Deegan | H04L 65/605 725/91 |
| 2016/0217136 A1* | 7/2016 | Maghraby | G06F 17/30752 |
| 2016/0219320 A1* | 7/2016 | Hain | H04L 29/06 |

* cited by examiner

*Primary Examiner* — Omar S Parra
(74) *Attorney, Agent, or Firm* — Farjami & Farjami LLP

(57) ABSTRACT

There is provided a method for use by a system. The method includes receiving live broadcasting of a segment of a video content from a live encoder; recording the segment in a video database of the non-transitory memory, receiving edits to the segment from a producer to produce an edited segment, encoding the edited segment to produce an encoded edited segment, and transmitting a network address of the encoded edited segment to a content management system (CMS) for distribution to a plurality of user devices.

16 Claims, 3 Drawing Sheets

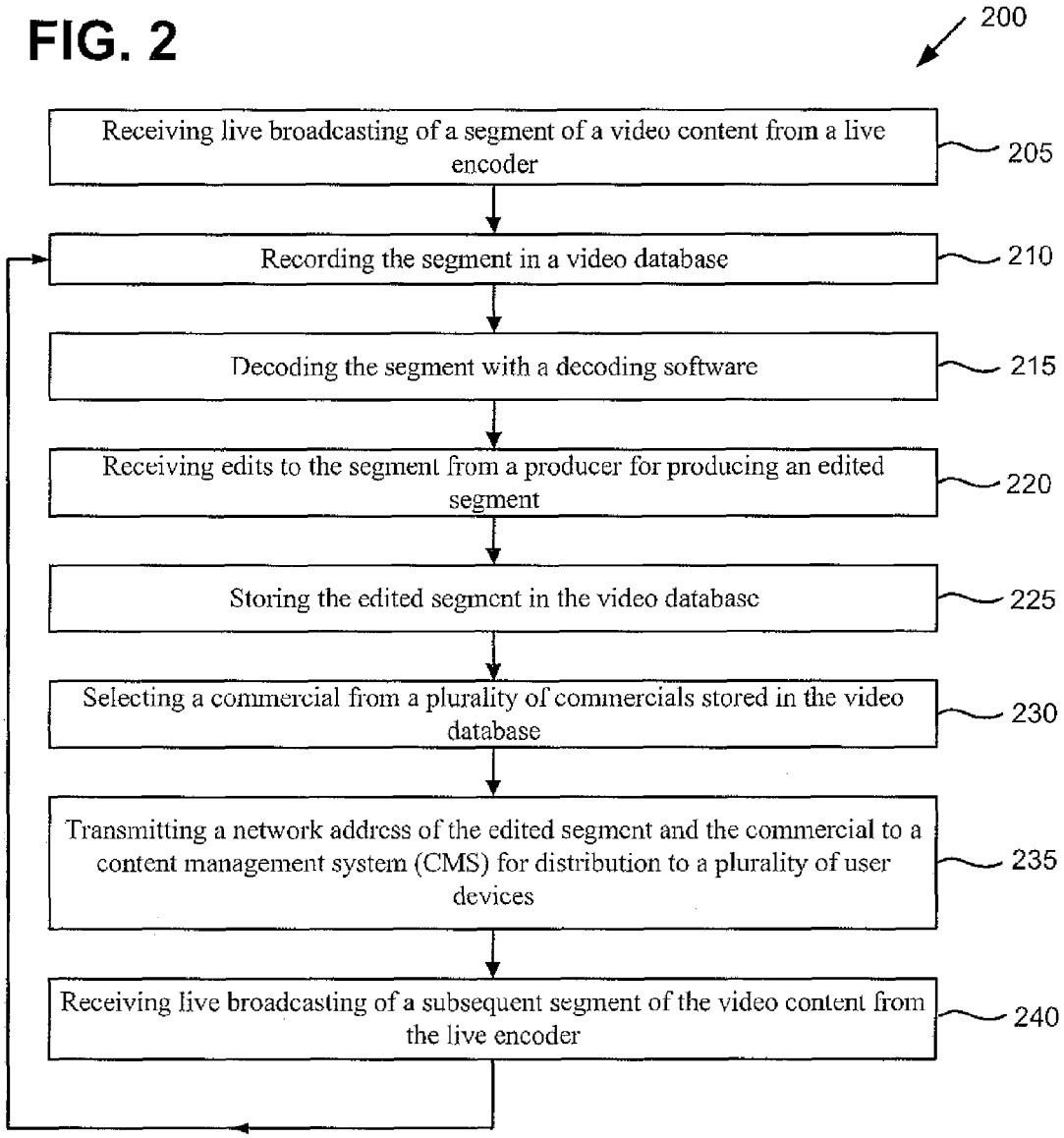

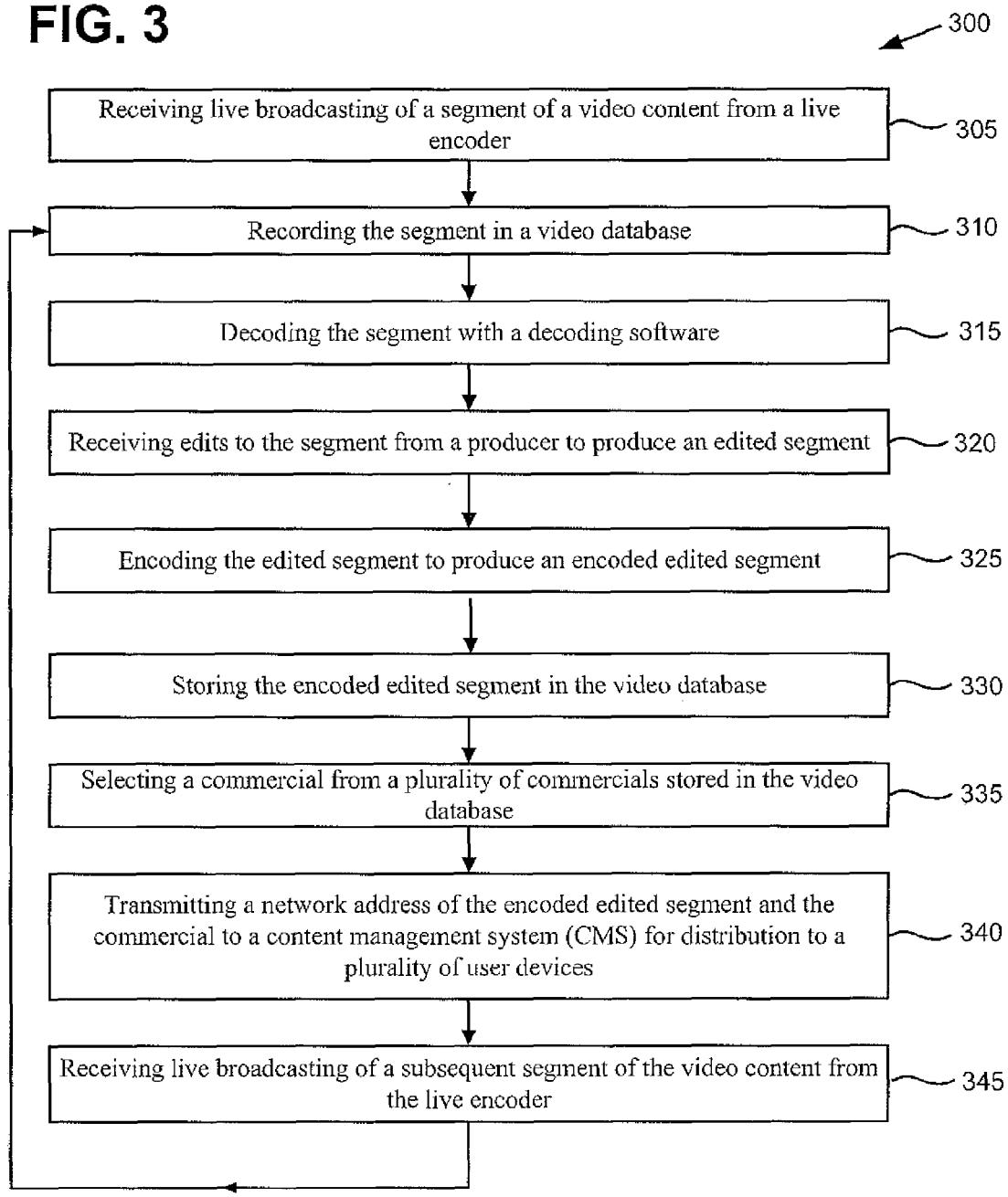

METHODS AND SYSTEMS FOR DYNAMICALLY EDITING, ENCODING, POSTING AND UPDATING LIVE VIDEO CONTENT

BACKGROUND

Nowadays it has become very popular for people to enjoy watching various video contents at a time of their choosing, such as watching TV series, late shows, sports games, etc., using video-on-demand (VOD) technologies. VOD allows viewers to select and watch video contents when at their leisure, rather than having to watch at a specific broadcast time. Currently, various content distributors offer VOD versions of TV shows, sports events and other types of video content, after the live broadcasting of the video content by a TV channel has ended.

SUMMARY

The present disclosure is directed to methods and systems for dynamically editing, encoding, posting and updating live video content, substantially as shown in and/or described in connection with at least one of the figures, as set forth more completely in the claims.

BRIEF DESCRIPTION OF THE DRAWINGS

FIG. 2 presents a flowchart illustrating an exemplary method of dynamically editing, posting, and updating live video content, according to one implementation of the present disclosure; and FIG. 3 presents a flowchart illustrating another exemplary method of dynamically editing, encoding, posting and updating live video content, according to one implementation of the present disclosure.

DETAILED DESCRIPTION

Figure 1:
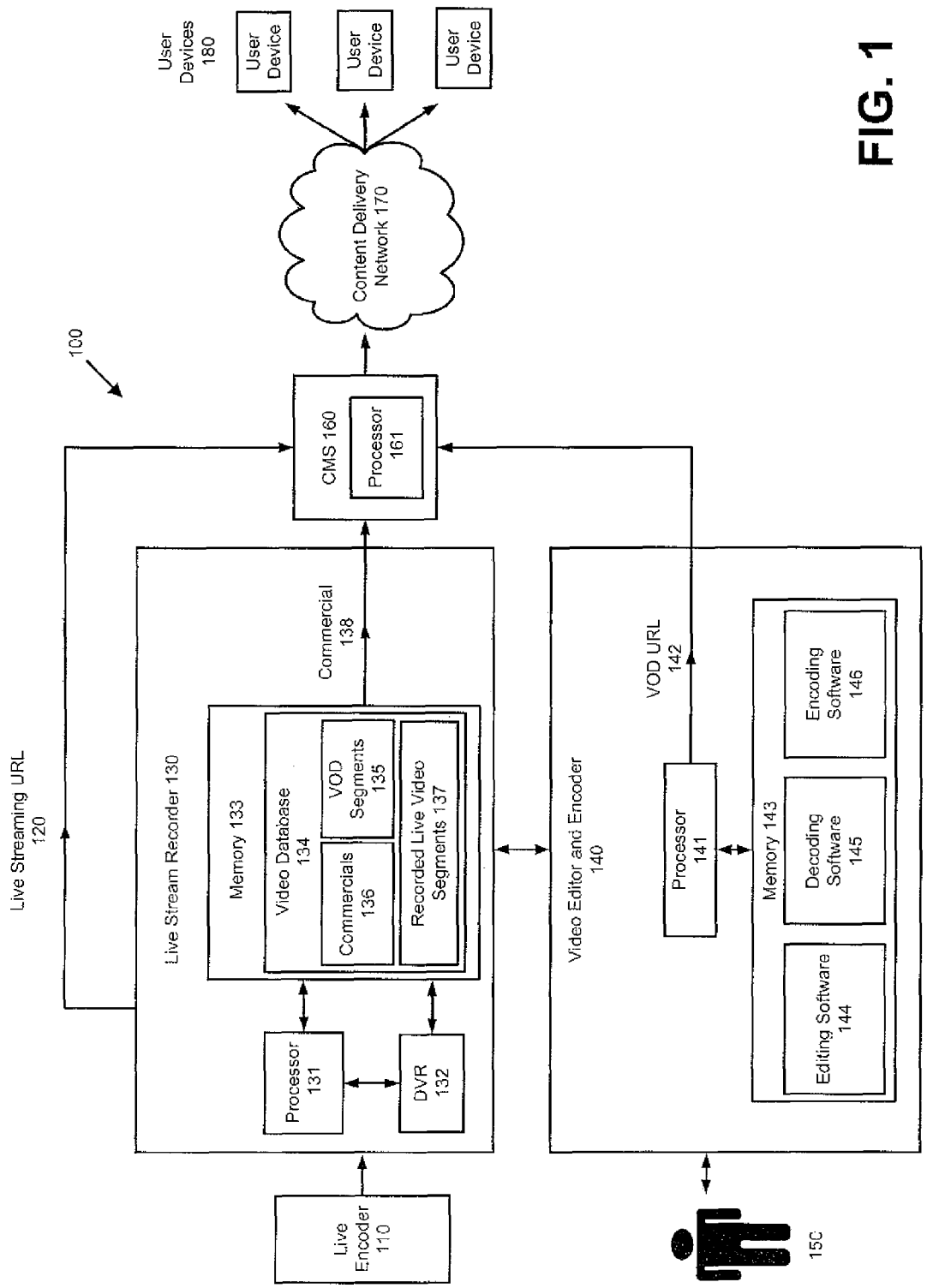
FIG. 1 presents a diagram of an exemplary system for dynamically editing, encoding, posting and updating live video content, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of exemplary system 100 for dynamically editing, encoding, posting and updating live video content, according to one implementation of the present disclosure. As shown in FIG. 1, system 100 includes live encoder 110, live stream recorder (LSR) 130, video editor and encoder (VED) 140, content management system (CMS) 160, content delivery network (CDN) 170, and user devices 180.

Live encoder 110 is any device or software program capable of encoding live broadcasting of video content and streaming the encoded live video content to LSR 130. LSR 130 is a system for receiving and recording of video content, as well as transmitting the video content to CMS 160 for distribution to user devices 180. As shown in FIG. 1, LSR 130 includes processor 131, DVR 132, and memory 133. Processor 131 may be any microprocessor or a similar hardware processor used in a computing device. According to FIG. 1, processor 131 may access memory 133 to store received input or to execute commands, processes, or programs stored in memory 133. Memory 133 is a non-transitory hardware storage device capable of storing commands, processes, and programs, such as software applications, for execution by processor 131. Memory 133 includes video database 134, which stores commercials 136, VOD segments 135, and recorded live video segments 136. Commercials 136 are video commercials stored in video database 134 that may be added to video content or may be used to replace video commercials already included in the video content as video content is received from live encoder 110. VOD segments 135 are segments of live video content that have been encoded to video-on-demand by VED 140. Recorded live video segments 136 are segments of live video content recorded by DVR 132. DVR 132 is a digital video recorder for recording live content received by LSR 130 from live encoder 110. In one implementation, DVR 132 may be a hardware-based digital video recorder that records and stores live video content in memory 133. In another implementation, DVR 132 may be a cloud-based software program or a software program stored in memory 133, which processor 131 may use to record and store live video content in memory 133.

In addition to live encoder 110 and LSR 130, system 100 includes VED 140 and CMS 160. VED 140 is a system for receiving, editing and encoding of video content, as well as transmitting the edited and encoded video content to CMS 160 for distribution to user devices 180. As shown in FIG. 1, VED 140 includes processor 141 and memory 142. Processor 141 may be any microprocessor or a similar hardware processor used in a computing device. According to FIG. 1, processor 141 may access memory 143 to store received input or to execute commands, processes, or programs stored in memory 143. Memory 143 is a non-transitory hardware storage device capable of storing commands, processes, and programs, such as software applications, for execution by processor 141. Memory 143 stores editing software 144, decoding software 145, and encoding software 146. Editing software 144 may be a web-based software program stored in memory 143, which may be used by producer 150 to edit video content. Editing software 143 provides a variety of editing features for truncating or adding content to video segments, swapping content including commercials, putting in pre-recording stops as well as obscuring and bleeping certain parts. Decoding software 145 is a software program for decoding or decompressing video content previously encoded by live encoder 110 to enable playback or editing of the video content. Encoding software 146 is a software program for encoding video content into video-on-demand. In one implementation, decoding software 145 or encoding software 146 may be cloud-based.

CMS 160 is a system for receiving a plurality of video content streams and transmitting them to CDN 170 for distribution to user devices 180. CDN 170 is a large distributed system of proxy servers capable of delivering WebPages and other Web content to user devices 180 based on, for instance, the geographic locations of user devices 180. User devices 180 may be any user interactive computing devices capable of receiving video content from content delivery network 170 and outputting it to a display.

Flowchart 200 of FIG. 2 illustrates an exemplary method of dynamically editing, posting, and updating live content, according to one implementation of the present disclosure. Flowchart 300 of FIG. 3 illustrates another exemplary method of dynamically editing, encoding, posting and updating live content, according to one implementation of the present disclosure.

Flow chart 200 of FIG. 2 begins, at 205, with LSR 130 receiving live broadcasting of a segment of a video content from live encoder 110, according to one implementation of the present disclosure. For instance, live encoder 110 may transmit the first ten seconds of a live football match that a TV channel is broadcasting. Data communication between live encoder 110 and LSR 130 may be performed using a Real-Time Messaging Protocol (RTMP). RTMP is a TCP-based protocol, which maintains persistent connections and allows low-latency communication between live encoder 110 and LSR 130.

At 210, processor 131 of LSR 130 begins recording each video segment in memory 133 as each video segment is received from live encoder 110, according to one implementation of the present disclosure. To record the video segment, processor 131 utilizes DVR 132 and subsequently stores the video segment in memory 130. More specifically, the video segment is stored as part of a plurality of recorded live video segments 137 in video database 134.

At 215, processor 141 of VED 140 begins decoding the video segment, according to one implementation of the present disclosure. Decoding the video segment refers to the conversion of the video segment, which was previously encoded, back to its original format. After the video segment is decoded, the video segment may be edited. In one implementation, producer 150 utilizing with VED 140 may manually edit the video segment using editing software 144. For instance, while viewing the video segment, producer 150 may notice an inappropriate content or a profanity in the content, which producer 150 may wish to censor by removing, obscuring, or bleeping. Another example is when the video segment includes a commercial that producer 150 may wish to remove from the video segment.

To circumvent the need for manual editing, in another implementation, processor 141 of VED 140 may be configured to automatically edit the video segment. For instance, in such an implementation, processor 141 may be configured to automatically remove the commercial already included in the video segment, as well as obscure or bleep profanities. To this end, processor 141 may execute editing software 144, which may contain various algorithms for automatically identifying the start and end times of commercials, as well as inappropriate language within the video segment, etc.

At 220, processor 141 receives edits to the segment from producer 150 to produce an edited segment, according to one implementation of the present disclosure. After receiving the edits, processor 141 transmits the edited segment to LSR 130 for the edited segment to be stored in video database 134. Accordingly, at 225, processor 131 stores the edited segment as part of a plurality of recorded live video segments 137 in video database 134.

At 230, processor 131 continues by selecting a commercial from a plurality of commercials stored in video database 134. In one implementation, the segment received from live encoder 110 may have initially included a commercial that producer 150 removed when editing the segment using editing software 144. For instance, the first commercial may have been a national commercial used during live broadcasting of the Super Bowl. However, producer 150 may wish to swap the first commercial with a second commercial (commercial 138) that is more relevant to the users of user devices 180, who may be located in a specific state or geography. In such an implementation, processor 131 may be configured to automatically select commercial 138 based on a variety of factors including the geographic location of a user device requesting the content. In another implementation, producer 150 may wish to provide user devices 180 with a commercial-free version of the live content received from live encoder 110. In such an implementation, after receiving the edited segment from VED 140, processor 131 may skip selecting commercial 138 at 230.

In yet another implementation, producer 150 may not wish to provide user devices 180 with an un-edited version of the segment received from live encoder 110. In such an implementation, processor 131 of LSR 130 may skip 215 to 225 and immediately select a commercial to add to the segment after the segment is recorded in the video database.

At 235, processor 131 continues by transmitting a network address of the edited segment and commercial 138 to CMS 160 for distribution to user devices 180. After receiving the network address of the edited segment and commercial 138 from LSR 130, processor 161 of CMS 160 transmits the network address to CDN 170 for distribution to user devices 180. For transmission of the network address of edited segment to CDN 170, CMS 160 may use data streaming protocols including HTTP Data Streaming (HDS) and HTTP Live Streaming (HLS). In the implementation where processor 131 has skipped selecting commercial 138 at 230, processor 131 of LSR 130 may only transmit a network address of the edited segment to CMS 160. In yet another implementation, immediately after receiving the segment from live encoder 110 at 205, processor 131 of LSER 130 may skip 210 to 230 and transmit a network address of the segment to CMS 160 for distribution to user devices 180. In such an implementation, processor 131 provides live streaming URL 120 to CMS 160 for transmission to CDN 170.

At 240, processor 131 of LSR 130 continues by receiving live broadcasting of a subsequent segment of the video content from live encoder 110. System 100 then continues to repeat the 210 to 235 resulting in dynamically editing, posting and updating segments of live video content received in order from live encoder 110. As an example, a football game may be scheduled to broadcast at 8:00 pm on a cable channel. When the game starts broadcasting, live encoder 110 encodes the live content and transmits the stream to LSR 130. For instance, ten seconds after 8:00 pm, CMS 160 has access to a ten-second segment of the live football game for editing and transmitting to CMS 160 for distribution to user devices 180. System 100 then performs 210 through 235 on the ten-second segment before receiving a subsequent segment of the live football game. After receiving the subsequent video segment, system 100 may repeat performing 210 through 235, until the live football program is over. For instance, twenty seconds after 8:00 pm, system 100 has access to another ten-second segment of the live football game for editing and transmitting to CMS 160. In this manner, system 100 continues to update CDN 170 with a new URL containing the latest segment of the football program. As a result of this, users are able to view an edited version of the live football game, or highlights thereof, shortly after the game starts broadcasting, without having to wait until live broadcasting of the game ends.

Turning now to FIG. 3, flow chart 300 begins, at 305, with LSR 130 receiving live broadcasting of a segment of a video content from live encoder 110, according to one implementation of the present disclosure. Data communication between live encoder 110 and LSR 130 is maintained using a Real-Time Messaging Protocol (RTMP). RTMP is a TCP-based protocol, which maintains persistent connections and allows low-latency communication between live encoder 110 and LSR 130.

At 310, processor 131 of LSR 130 begins recording the segment in memory 133 as it is received from live encoder 110, according to one implementation of the present disclosure. To record the segment, processor 131 utilizes DVR 132 and subsequently stores the segment in memory 130. More specifically, the segment is stored as part of a plurality of recorded live video segments 137 in video database 134.

At 315, processor 141 of VED 140 begins decoding the segment, according to one implementation of the present disclosure. Decoding the segment refers to the conversion of the segment, which was previously encoded, back to its original format. After the segment is decoded, it is ready to be edited. In one implementation, producer 150 working with VED 140 may manually edit the segment using editing software 144. For instance, while viewing the segment, producer 150 may notice inappropriate content or profanity, which producer 150 may wish to censor by removing, obscuring, or bleeping. Another example is when the segment includes a commercial that producer 150 may wish to cut from the segment.

To circumvent the need for manual editing, in another implementation, processor 141 of VED 140 may be configured to automatically edit the segment. For instance, in such an implementation, processor 141 may be configured to automatically remove the commercial already included in the segment as well as obscure or bleep profanities. For this purpose, processor 141 may execute editing software 144, which may contain various algorithms for automatically identifying the start and end times of commercials, as well as inappropriate language within the video segment, etc.

At 320, processor 141 receives edits to the video segment from producer 150 to produce an edited video segment, according to one implementation of the present disclosure. At 325, processor 141 continues by encoding the edited video segment to produce an encoded edited segment. More specifically, processor 141 utilizes encoding software 146 to convert the existing format of edited video segment into a digital VOD format. After encoding the edited video segment, VOD processor 141 may transmit the encoded edited segment to LSR 130 to be stored in video database 134. Next, at 330, processor 131 of LSR 130 stores the encoded edited segment as part of a plurality of VOD segments 135 in video database 134.

At 335, processor 131 continues by selecting a commercial from a plurality of commercials stored in video database 134. In one implementation, the video segment received from live encoder 110 may have initially included a commercial that producer 150 removed when editing the video segment using editing software 144. For instance, the first commercial may have been a national commercial used during live broadcasting of the Super Bowl. However, producer 150 may wish to swap the first commercial with a second commercial (commercial 138) that is more relevant to the users of user devices 180, who may be located in a certain state or geography. In such an implementation, processor 131 may be configured to automatically select commercial 138 based on a one or more factors, including the geographic location of a user device requesting the content.

At 340, processor 131 transmits a network address, such as a URL, of the encoded edited segment and commercial 138 to CMS 160 for distribution to user devices 180. After receiving the network address of the encoded edited segment and commercial 138 from LSR 130, processor 161 of CMS 160 transmits the network address to CDN 170 for distribution to user devices 180. For transmission of the network address of edited segment to CDN 170, CMS 160 may use data streaming protocols including HTTP Data Streaming (HDS) and HTTP Live Streaming (HLS). In one implementation, system 100 may skip 335 of selecting a commercial to be added to the encoded edited segment. In such an implementation, instead of transmitting the encoded edited segment to processor 131 of LSR 130 for transmission to CMS 160, processor 141 performs 340 of transmitting a network address of the encoded edited segment in VOD URL 142 to CMS 160. After receiving the network address of the encoded edited segment from VED 140, processor 161 of CMS 160 transmits the network address to CDN 170 for distribution to user devices 180. In yet another implementation, immediately after receiving the segment from live encoder 110 at 305, processor 131 of LSER 130 may skip 310 to 335 and transmit a network address of the segment to CMS 160 for distribution to user devices 180. In such an implementation, processor 131 provides live streaming URL 120 to CMS 160 for transmission to CDN 170.

At 340, processor 131 of LSR 130 receives live broadcasting of a subsequent segment of the video content from live encoder 110. System 100 may then continue to repeat the 310 to 340 for dynamically editing, posting and updating VOD segments of live video content received in order from live encoder 110. As an example, a football game may be scheduled to broadcast at 8:00 pm on a cable channel. When the game starts broadcasting, live encoder 110 encodes the live content and transmits the stream to LSR 130. For instance, ten seconds after 8:00 pm, CMS 160 has access to a ten-second segment of the live football game for editing, encoding and transmitting to CMS 160 for distribution to user devices 180. System 100 may then perform 310 through 340 on the ten-second video segment before receiving a subsequent video segment of the live football game. After receiving the subsequent video segment, system 100 may repeat performing 310 through 340 until the live football program is over. For instance, twenty seconds after 8:00 pm, system 100 may have access to another ten-second video segment of the live football game for editing, encoding and transmitting to CMS 160. In such a manner, system 100 continues to update CDN 170 with a new URL containing the latest segment of the football program. As such, users of user devices 180 are able to view an edited VOD version of the live football game, or highlights thereof, shortly after the game starts broadcasting and while the game is being played and being broadcast live, without having to wait until live broadcasting of the game ends.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of processing a live video broadcast having a plurality of video segments by a system having a hardware processor and a non-transitory memory to create a video-on-demand (VOD), the method comprising:
  for each of the plurality of video segments of the live video broadcast:
    receiving, using the hardware processor, a video segment of the plurality of video segments of the live video broadcast from a live encoder;
    recording, using the hardware processor, the video segment in a video database of the non-transitory memory;
    decoding the video segment recorded in the video database to generate a decoded video segment;
    receiving edits to the decoded video segment when provided by a producer to produce an edited video segment;
    encoding the edited video segment to produce an encoded edited segment;
    storing the encoded edited video segment in the video database of the non-transitory memory; and
    transmitting a network address of the encoded edited video segment to a content management system (CMS) for distribution to a plurality of user devices as the VOD while the live video broadcast is being broadcast on a channel;
    wherein, while the live video broadcast is being broadcast on the channel, each of the encoded edited video segments is stored in the video database, one after another, for distribution by the CMS to the plurality of user devices as the VOD.

2. The method of claim 1, wherein the edits include censoring the live video broadcast, and wherein the censoring comprises identifying and obscuring inappropriate content within the video segment.

3. The method of claim 1, wherein the video segment includes a first commercial.

4. The method of claim 3, wherein the edits include removing the first commercial from the video segment.

5. The method of claim 1 further comprising:
  selecting, using the hardware processor, a second commercial from a plurality of video commercials in the video database of the non-transitory memory to be added to the edited video segment.

6. The method of claim 1 further comprising:
  selecting, using the hardware processor, a second commercial from a plurality of video commercials in the video database of the non-transitory memory to be added to the encoded edited video segment.

7. The method of claim 1 further comprising:
  storing, using the hardware processor, the edited video segment in the video database of the non-transitory memory prior to the encoding.

8. The method of claim 1 further comprising:
  storing, using the hardware processor, the encoded edited video segment in the video database of the non-transitory memory prior to the transmitting.

9. A system for processing a live video broadcast having a plurality of video segments to create a video-on-demand (VOD), the system comprising:
  a non-transitory memory;
  for each of the plurality of video segments of the live video broadcast, a hardware processor configured to:
    receive a video segment of the plurality of video segments of the live video broadcast from a live encoder;
    record the video segment in a video database of the non-transitory memory;
    decode the video segment recorded in the video database to generate a decoded video segment;
    receive edits to the decoded video segment when provided by a producer to produce an edited video segment;
    encode the edited video segment to produce an encoded edited segment;
    store the encoded edited video segment in the video database of the non-transitory memory; and
    transmit a network address of the encoded edited video segment to a content management system (CMS) for distribution to a plurality of user devices as the VOD while the live video broadcast is being broadcast on a channel;
    wherein, while the live video broadcast is being broadcast on the channel, each of the encoded edited video segments is stored in the video database, one after another, for distribution by the CMS to the plurality of user devices as the VOD.

10. The system of claim 9, wherein the edits include censoring the live video broadcast, and wherein the censoring comprises identifying and obscuring inappropriate content within the video segment.

11. The system of claim 9, wherein the video segment includes a first commercial.

12. The system of claim 11, wherein the edits include removing the first commercial from the video segment.

13. The system claim 9, wherein the hardware processor is further configured to:
  select a second commercial from a plurality of video commercials in the video database of the non-transitory memory to be added to the edited video segment.

14. The system of claim 9, wherein the hardware processor is further configured to:
  select a second commercial from a plurality of video commercials in the video database of the non-transitory memory to be added to the encoded edited video segment.

15. The system of claim 9, wherein the hardware processor is further configured to:
  store the edited video segment in the video database of the non-transitory memory prior to the encoding.

16. The system of claim 9, wherein hardware processor is further configured to:
  store the encoded edited video segment in the video database of the non-transitory memory prior to the transmitting.

* * * * *